Sept. 12, 1967 N. A. KAMMILLER 3,341,748
HIGH-LOW VOLTAGE SENSITIVE SIGNALING
CIRCUIT UTILIZING SEMICONDUCTORS
Filed May 13, 1964
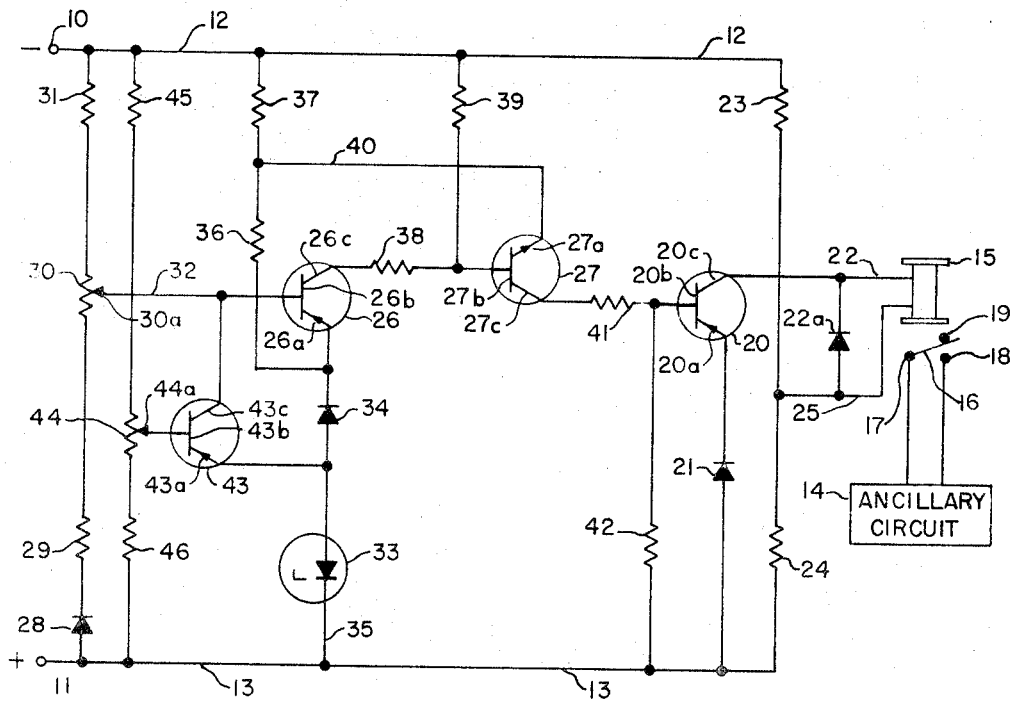
*INVENTOR.*
NEIL A. KAMMILLER
BY
ATTY.

United States Patent Office 3,341,748
Patented Sept. 12, 1967

3,341,748
HIGH-LOW VOLTAGE SENSITIVE SIGNALING
CIRCUIT UTILIZING SEMICONDUCTORS
Neil A. Kammiller, North Olmsted, Ohio, assignor to
Lorain Products Corporation, a corporation of Ohio
Filed May 13, 1964, Ser. No. 367,181
7 Claims. (Cl. 317—148.5)

ABSTRACT OF THE DISCLOSURE

A signalling circuit for indicating when the voltage of a monitored circuit becomes greater than a predetermined maximum or less than a predetermined minimum value. The signalling device is a relay, energized when the voltage being monitored is satisfactory and deenergized when the monitored voltage falls outside of prescribed limits. The relay is in series circuit relationship with, and energized by a first PNP transistor when the latter is conducting and the conducting condition is maintained by comparison of the input voltage with constant voltage means so that if the input voltage is above a predetermined minimum value the transistor conducts and the relay is energized to open a signalling circuit. A second, NPN transistor in emitter-base, shunt relationships to the first transistor is also conduction controlled by comparison of the input voltage with the constant voltage means. When the monitored voltage exceeds a predetermined maximum value, the second transistor is rendered conducting to shut off the first transistor and thus deenergize the relay. When energized, the relay holds an armature up to open the signalling circuit. When deenergized, the relay drops the armature to close the signalling circuit.

---

This invention relates to signaling circuits and is directed more particularly to circuitry utilizing semiconductors and adapted to close an ancillary circuit if a voltage being monitored becomes either greater than a predetermined maximum value or less than a predetermined minimum value.

In the telephone industry wet-cell batteries are frequently used to supply power for the telephone system in the event of failure of commercial A-C power. Usually the output voltage of a battery charger connected across the battery is set to a value designated as float voltage wherein the battery is maintained in fully charged condition, and the current for the telephone system is supplied from the battery charger.

This float voltage applied to the battery by the charger must be maintained within close limits since even slight over-voltage will cause gassing and excessive water loss from the battery and can ruin it in a short time. It is therefore desirable that either an alarm or regulating activity take place should excessive voltage be applied to the battery. On the other hand, it is equally important that an alarm and/or voltage regulating activity be initiated if the battery voltage of a telephone system drops to a point where it is unsuitable for proper operation of equipment energized from the battery.

In the past, the above described functions have often been accomplished by means of high-low voltmeters which are essentially meter movements having a plurality of contacts, one of which moves with the armature. Such devices, in addition to being expensive, are sensitive to physical shock and vibration.

Accordingly it is one object of the invention to provide high-low voltage sensitive signaling circuitry which is inexpensive and is relatively unaffected by shock or vibration.

It is also an object of the invention to provide circuitry which will close an ancillary circuit when an input voltage being monitored becomes greater than a predetermined maximum value or less than a predetermined minimum value.

It is another object of the invention to provide highly sensitive circuitry of the above character utilizing semiconductors and which responds to minute variations of the monitored voltage above the predetermined maximum voltage or below the predetermined minimum voltage.

It is a further object of the invention to provide a signaling circuit including an output circuit in which a relay is energized by a transistor which is normally conducting but which is rendered nonconducting by a high voltage section of the input circuit if the monitored voltage exceeds a predetermined maximum value or by a low voltage section of the input circuit if the monitored voltage drops below a predetermined minimum value.

In accordance with certain aspects of the invention there is provided what are termed herein initiators or initiator semiconductor elements. These elements are voltage change responsive means which, in turn, activate responsive semiconductor elements. The latter elements serve to energize ancillary circuit means which may provide voltage control or signals, or both.

Still another object of the invention is to provide signaling circuitry in which a first initiator controls a relay through amplifying circuits and in which a second initiator controls the relay through the same amplifying circuits and through the first initiator.

Referring to the single figure, it will be seen that the circuitry embodying the invention may include input terminals 10 and 11 to which are connected leads 12 and 13, respectively. Control of an ancillary circuit 14 is effected by means of a relay 15 or current energized switch having an armature 16 and contacts 17, 18 and 19. Contacts 17 and 18 are connected to ancillary circuit 14 so that when the relay 15 is de-energized a circuit 14 will be completed through contacts 17 and 18 and the armature 16. However, when relay 15 is energized, armature 16 will be pulled up against contact 19 and the ancillary circuit 14 will be open.

The ancillary circuit to be controlled may comprise, by way of example, suitable alarm lamps, end cells or voltage dropping elements.

The relay 15 is controlled by a P–N–P type transistor 20 having an emitter electrode 20a connected to the lead 13 through a diode 21, a base electrode 20b, the connections of which will be described presently, and a collector electrode 20c connected as shown to the upper end of relay 15 through a lead 22. The diode 21 biases transistor 20 so it will not turn on unless an input signal is applied to the base electrode 20b. The current path for relay 15 is completed by connecting the lower end thereof to a point between resistors 23 and 24 through a lead 25. The resistors 23 and 24 are connected to form a voltage divider between leads 12 and 13. A diode 22a may be connected between leads 22 and 25 to prevent excessive voltage from appearing on transistor 20 when it turns off. With the foregoing arrangement, the relay 15 will be energized when transistor 20 conducts.

It will be understood, of course, that the N–P–N and P–N–P type transistors utilized in the circuitry described herein may be replaced by P–N–P and N–P–N types, respectively, if the polarity of the input voltage and the connections of all diodes are reversed.

To the end that transistor 20 will be rendered conducting to energize the relay 15 if the input voltage becomes greater than a predetermined minimum value, there is provided a low voltage section which may include a P–N–P type transistor 26 and an intermediate amplifier which may include a P–N–P type transistor 27. Transistor 26 serves as a first initiator and responds to low voltage input conditions by comparing a portion of the input voltage applied to the input terminals 10 and 11 to a constant voltage reference as will be seen presently.

The portion of the input voltage to be used in the comparison is supplied from the voltage divider network formed between leads 12 and 13 by a stabistor 28, a resistor 29, a potentiometer 30 having a wiper arm 30a and a resistor 31. This voltage divider may be considered as a first input voltage proportioning means. The wiper arm 30a is connected through a lead 32 to a base electrode 26b of transistor 26. The constant voltage reference for transistor 26 is provided by connecting the emitter electrode 26a thereof to a zener diode 33 through a diode 34, the zener diode being connected to the lead 13 through a lead 35. Diode 34, as will be seen presently, provides a bias voltage which helps transistor 26 to turn off in response to the activity of a high voltage sensing section to be explained presently. The operating point of the zener diode 33 is established by connecting the emitter electrode 26a to lead 12 through resistors 36 and 37. The collector electrode 26c of transistor 26 is connected to lead 12 through resistors 38 and 39 to complete the emitter-collector current path for that transistor.

To the end that the responsive relay operating transistor 20 will be controlled by first initiator transistor 26 through responsive transistor 27, the collector electrode 27c is connected to the lead 13 through resistors 41 and 42.fl The conduction of transistor 27 is established by connecting the base electrode 27b to a point between resistors 38 and 39. Connecting the base electrode 20b of transistor 20 to a point between resistors 41 and 42 effects control of transistor 20 by the intermediate transistor 27.

Operation of the above circuitry will now be explained. Assuming that the voltage applied to the input terminals 10 and 11 is zero, there will be no current flow in any network of the circuit and relay 15 will be in a deenergized condition in which the armature 16 is released and the ancillary circuit 14 is closed and operative. As the input voltage increases, a point will be reached at which the zener diode 33 will begin to conduct and the constant voltage will be established thereacross. When the voltage between wiper arm 30a and lead 13 becomes greater than the voltage between emitter electrode 26a and lead 13, that is, greater than the sum of the voltages of diode 34 and the zener diode 33, the transistor 26 will be forward biased and will begin to conduct. The transistor 26 thus serves as a first initiator. The value of input voltage at which transistor 26 will conduct may be selected by adjustment of the wiper arm 30a.

Conduction of the transistor 26 causes current to flow from input terminal 11 through lead 13, lead 35, zener diode 33, the emitter-collector path of transistor 26, resistor 38, resistor 39 and lead 12 to input terminal 10. This current flow causes the lower end of resistor 39, and consequently the base of the responsive transistor 27, to become positive with respect to lead 12 thereby forward biasing transistor 27 causing it to conduct. When responsive transistor 27 conducts, current will flow from input terminal 11 through lead 13, resistor 42, resistor 41, the collector-emitter path of transistor 27, resistor 37 and lead 12 to input terminal 10. This current flow produces the voltage across resistor 42 and when this voltage is great enough to cause the base electrode 20b of the responsive transistor 20 to be negative with respect to the emitter thereof, transistor 20 will conduct.

Conduction of transistor 20 allows current to flow from input terminal 11 through lead 13, diode 21, the emitter-collector path of transistor 20, lead 22, relay 15, lead 25, resistor 23 and lead 12 to input terminal 10. Thus, when the input voltage is above the predetermined minimum value and below the predetermined maximum value, the conduction of transistor 20 produced in response to the conduction of transistors 26 and 27 energizes the relay 15 to open the ancillary circuit 14 whereby no alarm or voltage regulating occurs.

The circuit as described above is now in a mode of operation in which it will remain as long as the input voltage is greater than a predetermined minimum value or less than a predetermined maximum value. If the input voltage drops below the predetermined minimum value, as selected by wiper arm 30a, transistor 26 will turn off since the voltage between wiper arm 30a and lead 13 will be insufficient to maintain a forward bias of that transistor. When transistor 26 ceases to conduct, transistors 27 and 20 will likewise turn off thereby deenergizing relay 15. The zener diode 33, however, does not cease to conduct unless the input voltage drops to a very low value. Because the zener diode 33 maintains its constant voltage even when the input voltage is substantially lower than the predetermined minimum value, the sensing action of transistor 26 is maintained and transistor 26 will again turn on when the input voltage becomes greater than the predetermined value.

To the end that relay 15 will become deenergized to close the ancillary circuit 14 in the event that the voltage applied to the input terminals 10 and 11 becomes greater than a predetermined maximum value, there is provided a high voltage section which may include a P-N-P type, second initiator transistor 43 having an emitter electrode 43a, a base electrode 43b and a collector electrode 43c. The collector electrode 43c is connected to lead 32 while the emitter electrode 43a is connected to a point between zener diode 33 and the diode 34. In order to effect a comparison of the input voltage to the constant voltage of the zener diode 33, the base electrode 43b of transistor 43 is connected to a wiper arm 44a of a potentiometer 44, the upper end of the potentiometer being connected to the lead 12 through a resistor 45 while the lower end of the potentiometer is connected to the lead 13 by means of a resistor 46. The potentiometer 44 with the resistors 45 and 46 forms a voltage divider which serves as a second input voltage proportioning means.

Assuming that the input voltage is greater than the predetermined minimum value and that transistors 26, 27 and 20 are conducting with the relay 15 energized, the operation of the high voltage section will now be described.

If the input voltage becomes greater than the predetermined maximum value selected by means of wiper arm 44a, the voltage between the wiper arm 44a and lead 13 becomes greater than the constant voltage of the zener diode 33 and transistor 43 becomes forward biased and begins to conduct. Thus transistor 43 serves as a second initiator. It will be seen that the emitter-collector path of transistor 43 is in parallel with the emitter-base current path of transistor 26 which includes the diode 34. This diode insures that the base electrode 26b can become less negative than emitter electrode 26a when transistor 43 conducts so that transistor 26 can turn off. It will be seen that transistor 26 serves a dual function in that it functions as a first initiator when the input voltage becomes greater than a predetermined minimum value and also performs as responsive means through which the second initiator deenergizes the relay when the input voltage becomes greater than a predetermined maximum value.

When transistor 43 conducts, sufficient current is shunted around the emitter-base path of transistor 26 to turn that transistor off. With regard to voltage considerations, when the transistor 43 conducts, the emitter-base voltage of transistor 26 becomes too low to maintain transistor 26 in a conducting condition and, in effect, transistor 26 senses a low voltage condition. Accordingly, when the input voltage becomes greater than a predetermined maximum value, transistor 43 will conduct causing transistors 26, 27 and 20 to turn off thereby deenergizing the relay 15. When the input voltage drops below the predetermined maximum value, transistor 43 will turn off and transistors 26, 27 and 20 will be rendered conducting to energize relay 15.

From the foregoing description it will be seen that there is provided semiconductor circuitry in which a first initiator transistor 26 in a low voltage section causes a relay to be energized when an input voltage being monitored becomes greater than a predetermined minimum value and in which a second initiator in a high voltage section causes deenergization of the relay through the first initiator transistor 26 when the input voltage becomes greater than a predetermined value. The first initiator 26 is common to both the low voltage circuit section and the high voltage circuit section in that it initiates operation of the relay when the input voltage rises above a predetermined minimum value and functions as responsive means through which the second initiator controls the relay when the input voltage is above a predetermined maximum value.

It will be understood that the embodiment shown herein is for explanatory purposes and may be changed or modified without departing from the spirit and scope of the invention as set forth in the claims appended hereto.

What I claim is:

1. In a circuit adapted to energize a relay when a voltage being monitored is greater than a predetermined minimum value and less than a predetermined maximum value, in combination, a pair of input terminals, first, second and third voltage divider networks connected across said input terminals, a first diode and a zener diode serially connected with a fourth voltage divider network across said input terminals, a first resistive means, first variable conducting means having a control electrode and connected serially with said first resistive means between said first diode and one of said input terminals, said control electrode of said first variable conducting means being connected to said first voltage divider, second resistive means, second variable conducting means having a control electrode and serially connected with said second resistive means between the other of said input terminals and a point on said fourth voltage divider network, a relay, a second diode, third variable conducting means, means for connecting said second diode, said third variable conducting means, and said relay serially between said other of said input terminals and a point on said third voltage divider means, fourth variable conducting means having a control electrode and connected between said zener diode and the control electrode of said first variable conducting means, said control electrode of said fourth variable conducting means being connected to said second voltage divider network.

2. A high-low voltage signalling circuit including a pair of input terminals, first, second and third voltage dividers connected across said input terminals, said first voltage divider including a stabistor, a first transistor, a fourth voltage divider connected between the emitter of said first transistor and one of said input terminals, a first diode and a zener diode serially connected between the emitter of said first transistor and the other of said input terminals, means for connecting the base of said first transistor to said first voltage divider, a first resistive network connected between the collector of said first transistor and said one of said input terminals, a second transistor having the emitter thereof connected to said fourth voltage divider and the base thereof connected to said first resistive network, a second resistive network connected between the collector of said second transistor and said other of said input terminals, a relay, a third transistor having the base thereof connected to said second resistive network, the emitter thereof connected to said other of said input terminals through a second divider and the collector thereof connected to said third voltage divider through said relay, a fourth transistor having an emitter connected to a point between said first diode and said zener diode, a collector connected to said base of said first transistor, and a base connected to said second voltage divider.

3. A voltage sensitive circuit including first and second input terminals, first and second input voltage proportioning means connected between said input terminals, a constant voltage source, unidirectional current conducting means, first variable conducting means having an input section and an output section, means for connecting said constant voltage source, said unidirectional current conducting means and said input section of said first variable conducting means serially between said first input terminal and a point on said first input voltage proportioning means, a current energizing switch, means for connecting said output section of said first variable conducting means, a current energized switch, means for connecting said unidirectional current conducting means and said second input terminal, second variable conducting means having an input section and an output section, means for connecting said input section of said second variable conducting means between said constant voltage means and said second input voltage proportioning means, means for connecting said output section of said second variable conducting means in shunt relationship to said input section of said first variable conducting means and said unidirectional current conducting means.

4. A voltage sensitive circuit having input terminals and including first input voltage proportioning means connected between said input terminals, constant voltage means, a first initiator having input means and output means, means for connecting said input means of said first initiator between said constant voltage means and said first input voltage proportioning means, a current energized switch, means for connecting said output means of said first initiator to said current energized switch whereby said switch is energized when said first initiator conducts, second input voltage proportioning means, means for connecting said second input voltage proportioning means between said input terminals, variable conducting means having a control electrode connected to said second input voltage proportioning means, means for connecting said variable conducting means in current conducting shunt relationship between said constant voltage means and said input means of said first initiator to render said first initiator inoperative when the input voltage becomes greater than a predetermined value.

5. A voltage sensitive circuit having input terminals and including first input voltage proportioning means, means for connecting said first input voltage proportioning means between said terminals, a constant voltage source, variable conducting means having an input section and an output section, means for connecting said input section of said variable conducting means between one side of said constant voltage source and said first input voltage proportioning means, means for connecting the other side of said constant voltage source to one of said input terminals, a current energized switch serially connected with the output section of said variable conducting means, second input voltage proportioning means, means for connecting said second input voltage proportioning means between said terminals, second initiator means, means for connecting said second initiator means between said constant voltage source and said second input voltage proportioning means to compare the potential of said constant voltage source to the voltage of said second input voltage proportioning means and to render said variable conducting means nonconducting if the input voltage is greater than a predetermined maximum value.

6. In a voltage sensitive circuit having a pair of input terminals and including a current energized switch, first input voltage proportioning means connected between said input terminals, constant voltage means, first initiator means, means for connecting said constant voltage means between one of said input terminals and said first input voltage proportioning means, means for connecting said first initiator means in voltage comparing relationship between said constant voltage means and said first input voltage proportioning means whereby said first initiator means is rendered conducting when the input voltage exceeds a predetermined minimum value, means for connecting said first initiator means in current conducting relationship to said switch, second input voltage proportioning means connected between said input terminals, second initiator means, means for connecting said second initiator means in voltage comparing relationship between said constant voltage means and said second input voltage proportioning means whereby said second initiator means is rendered nonconducting when the input voltage exceeds a predetermined maximum value and conducting when the input voltage is below said maximum value and means connecting said second initiator means to said first initiator means in shunt relationship to render said first initiator means nonconducting when said second initiator means is rendered conducting.

7. In a voltage sensitive circuit having first and second input terminals and adapted to open and close an ancillary circuit, in combination, energizable operating means, first initiator means, means for rendering said first initiator means conducting when the input voltage across said input terminals exceeds a predetermined minimum value, responsive means, means for connecting said responsive means in current conducting relationship to said first initiator means and in current conducting relationship to said energizable operating means for directing current through said energizable operating means when said first initiator means is conducting current, second initiator means, means for rendering said second initiator means conducting when the input voltage across said input terminals exceeds a predetermined maximum value, means for connecting said second initiator means to said first initiator means in conducting control relationship to render said first initiator means nonconducting when said second initiator means is rendered conducting, said first initiator means acting as responsive means with respect to said second initiator means when said second initiator means is conducting.

References Cited
UNITED STATES PATENTS

| | | | |
|---|---|---|---|
| 3,041,469 | 6/1962 | Ross | 307—88.5 |
| 3,098,964 | 7/1963 | Hetzler | 322—28 |
| 3,139,562 | 6/1964 | Freeborn | 317—148.5 |
| 3,156,772 | 12/1964 | VanDorn | 317—148.5 |
| 3,239,718 | 3/1966 | Fegley | 317—32 |

MILTON O. HIRSHFIELD, *Primary Examiner.*

L. T. HIX, *Examiner.*